United States Patent [19]

Brotto

[11] Patent Number: 5,642,031

[45] Date of Patent: Jun. 24, 1997

[54] BATTERY RECHARGING SYSTEM WITH STATE OF CHARGE DETECTION THAT INITIALLY DETECTS WHETHER A BATTERY TO BE CHARGED IS ALREADY AT OR NEAR FULL CHARGE TO PREVENT OVERCHARGING

[75] Inventor: Daniele C. Brotto, Baltimore, Md.

[73] Assignee: Black & Decker Inc., Newark, Del.

[21] Appl. No.: 203,541

[22] Filed: Feb. 28, 1994

[51] Int. Cl.⁶ ............................................. H01M 10/44
[52] U.S. Cl. ............................ 320/21; 320/31; 320/39
[58] Field of Search ........................... 320/20, 21, 22, 320/23, 24, 31, 32, 39, 40, 43, 44, 45

[56] References Cited

U.S. PATENT DOCUMENTS 4,388,582  6/1983  Saar et al. ............................ 320/20
4,392,101  7/1983  Saar et al. ............................ 320/20
5,331,268  7/1994  Patino et al. .......................... 320/20
5,365,160  11/1994 Leppo et al. ....................... 320/20 X
5,432,426  7/1995  Yoshida ................................. 320/20
5,442,274  8/1995  Tamai .................................... 320/23
5,449,996  9/1995  Matsumoto et al. .................. 320/20
5,449,997  9/1995  Gilmore et al. ...................... 320/39

Primary Examiner—Edward Tso
Attorney, Agent, or Firm—Harness, Dickey & Pierce, P.L.C.

[57] ABSTRACT

A state of charge test is first performed on the battery by applying a current pulse and then observing the voltage decay characteristics which result. Batteries which are initially nearly fully charged exhibit a larger voltage decay than batteries which are not as fully charged. The result of this initial state of charge test is used to determine how to best terminate battery charging. In this way battery overcharging is prevented regardless of the initial state of charge of the battery.

47 Claims, 3 Drawing Sheets

BATTERY RECHARGING SYSTEM WITH STATE OF CHARGE DETECTION THAT INITIALLY DETECTS WHETHER A BATTERY TO BE CHARGED IS ALREADY AT OR NEAR FULL CHARGE TO PREVENT OVERCHARGING

BACKGROUND AND SUMMARY OF THE INVENTION

The present invention relates generally to rechargeable batteries and to electronic circuits for charging rechargeable batteries.

Rechargeable batteries have become quite popular for use in electronic equipment, power tools, portable computers, children's toys, and the like. Virtually every user of rechargeable batteries wants the ability to recharge as quickly as possible. In addition, some users like the convenience of being able to leave a rechargeable battery in the charger at all times, so that a fully charged battery will always be available. To accommodate the former requirements there are a number of quick-charging battery chargers available. To accommodate the latter there are a number of trickle charging battery chargers available.

Whether the battery charger is designed as a quick-charger or as a trickle charger, it is highly desirable that the charger avoid overcharging. Overcharging produces undesired heating and high pressure conditions which can chemically alter and degrade the battery's capacity to hold charge. This problem is particularly prevalent when quick-charging battery chargers are used. Quick-charging battery chargers typically deliver a high charging current which can rapidly overheat the battery unless the charging current is terminated or greatly reduced once the fully charged condition is reached.

Determining precisely when to terminate the high charging current is not simply a matter of sensing when the battery voltage reaches a fully charged level. In most batteries the voltage rises in a nonlinear way as charging current is applied and it is often difficult to accurately sense or predict when the fully charged voltage is reached.

The applicant's assignee has devoted a considerable effort in analyzing the voltage characteristics of rechargeable batteries as charging current is applied. It is now known that the battery voltage increases over time as charging current is applied and that the voltage-time curve exhibits various inflection points where the slope of the first derivative curve of the voltage variation with time curve actually changes from positive to negative or from negative to positive. The Saar et al. U.S. Pat. Nos. 4,388,582 and 4,392,101, assigned to the assignee of the present invention, describe these inflection points in conjunction with a rapid charging system for rechargeable batteries.

Although the inflection point analysis technique described in the Saar et al. patents has been widely successful, there is still room for improvement. Specifically, the Saar et al. technique predicates termination of the charging current based on a falling first derivative of the voltage after a previously detected rising first derivative. The Saar et al. system works well for charging fully discharged batteries. However, a battery that is not fully discharged (e.g. one which starts out already nearly fully charged) often does not exhibit the rising-falling first derivative sequence. When this sequence is not detected it is possible for the charger to continue to supply high charging current to the battery after it is already fully charged. This can cause overtemperature and high pressure conditions in the battery, greatly reducing the battery life and capacity to hold a charge.

The present invention solves the aforementioned problem by utilizing a technique which, at the outset of the charging cycle, performs a state-of-charge test on the battery and from this test determines which control scheme will be used to terminate charging.

More specifically, the state of charge is detected by applying a test current to the battery for a predetermined time (preferably a short period of time) and thereafter sampling the battery voltage at least twice to determine a time rate of change in battery voltage, as the battery responds to the applied test current. In this way, the charging circuit is able to detect where the battery is on the voltage-time charging curve and this information is used to automatically select what voltage inflection conditions to detect in determining when to terminate the charging current.

The technique of the invention is quite effective in preventing overtemperature and high pressure conditions associated with overcharged batteries. This results in increased battery life, faster full charge indication, and greater convenience for the user. For a more complete understanding of the invention, its objects and advantages, reference may be had to the following specification and to the accompanying drawings.

DETAILED DESCRIPTION OF THE PREFERRED EMBODIMENTS

The following description of the preferred embodiments concerning fast battery charging is merely exemplary in nature and is in no way intended to limit the invention or its application or uses.

Figure 1:
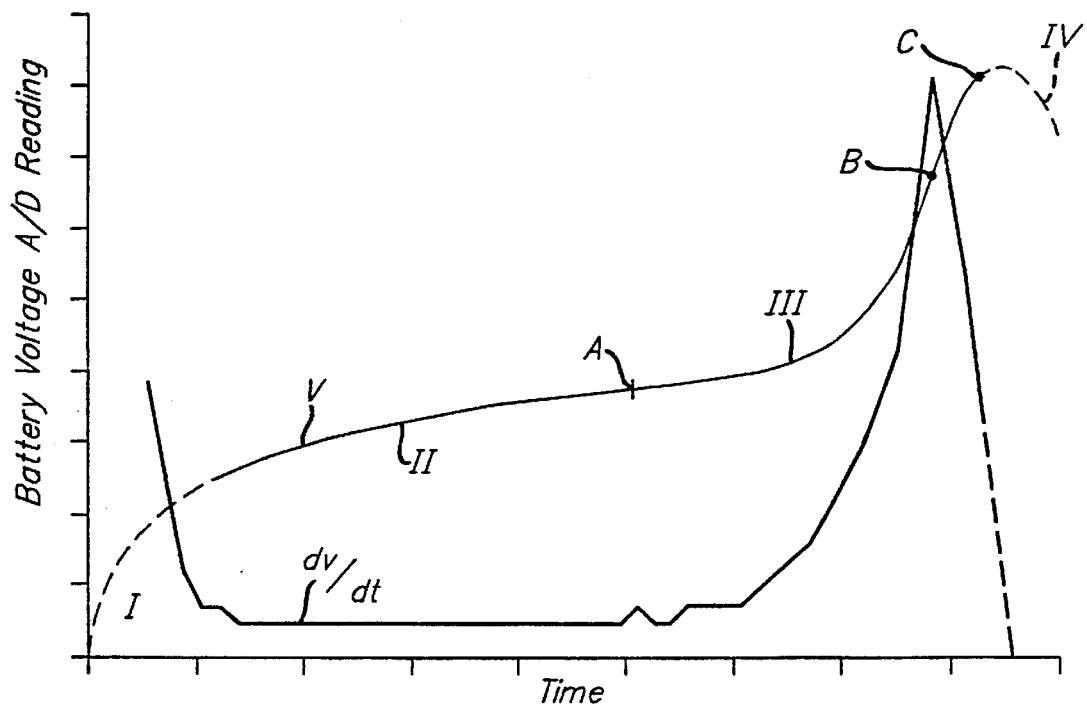
FIG. 1 is an exemplary voltage-time charging curve and first derivative curve for a nickel cadmium battery showing exemplary inflection points at A and B.

As disclosed in the Saar et al. patents, a typical voltage-time curve of a charging sequence of a nickel cadmium (NiCad) battery is shown in FIG. 1. It is noted that the discussion herein is directed to charging a single battery; however, it is equally applicable to a series of batteries as would be found in a battery pack. As the battery is being charged, the voltage continuously rises as indicated by the curve until it reaches a desirable maximum charge point. Although the specific values of the curve may differ from battery to battery, the general shape of the curve is typical for all nickel cadmium batteries. Likewise, each other type of rechargeable battery known in the art will have a typical voltage-time curve indicative of its type and, as such, the process discussed below is applicable to any of these other types.

As shown, the voltage-time curve can be separated into at least four distinct regions. Region I represents the beginning of the charging sequence just after the battery is initially attached to the charger and the charging begins. This region is represented by a dotted line due to the fact that the voltage characteristics in this region are somewhat unreliable and may vary from battery to battery in accordance with its prior history of being charged and discharged and its present state of discharge. Additionally, this region is of little importance in the charging sequence since it is generally traversed within a relatively short period of time (usually between 30 to 120 seconds) after the start of the charging sequence.

After the charging sequence passes through region I, the charging curve will enter the more stable region II. Region II is generally the longest region of the charging sequence, and is marked by most of the internal chemical conversion within the battery itself. Because of this, the voltage of the battery does not substantially increase over region II, and thus, this region represents a plateau region in the charging curve. At the end of region II is an inflection point A in the curve. Inflection point A represents a transition from region II to region III, and is noted by a point where the slope of the curve changes from a decreasing rate to an increasing rate.

Region III is the region in which the battery voltage begins to increase rapidly with respect to time, thus representing a region of rapid voltage rise. As the battery voltage increases through region III to its fully charged condition, the internal pressure and temperature of the battery also increases. When the effects of temperature and pressure within the battery begin to take over, the increase in battery voltage begins to taper off. This tapering off effect is noted as inflection point B and is also characterized by the sharp fall in the voltage derivative curve dV/dt.

Region IV represents the fully charged region following the inflection point B and including charge termination target represented by point C. The charging voltage only stabilizes at point C for a very short period of time. Consequently, if charging continues, the additional heating within the battery will cause the voltage of the battery to decrease and in addition may cause damage to the battery.

The Saar et al. patents disclose a method of analyzing the battery voltage versus time-charging curve by detecting the inflection points in the curve in order to determine the appropriate time to terminate the fast charge process. By measuring the slope of the charge curve at a predetermined sampling rate, it is possible to first determine inflection point A and then begin looking for inflection point B. Since the sampling period is constant, the calculation of the slope is merely a subtraction of the most recent voltage sample from a previous voltage sample. However, once the occurrence of inflection point B is detected, the battery voltage is actually beyond inflection point B. Thus, by terminating charging upon the detection of the second inflection point B, the battery voltage is actually at a point approximated by point C on the curve when charging is discontinued. Accordingly, it will be appreciated that this charge control procedure avoids overcharging of the battery into region IV of the curve.

Figure 2:
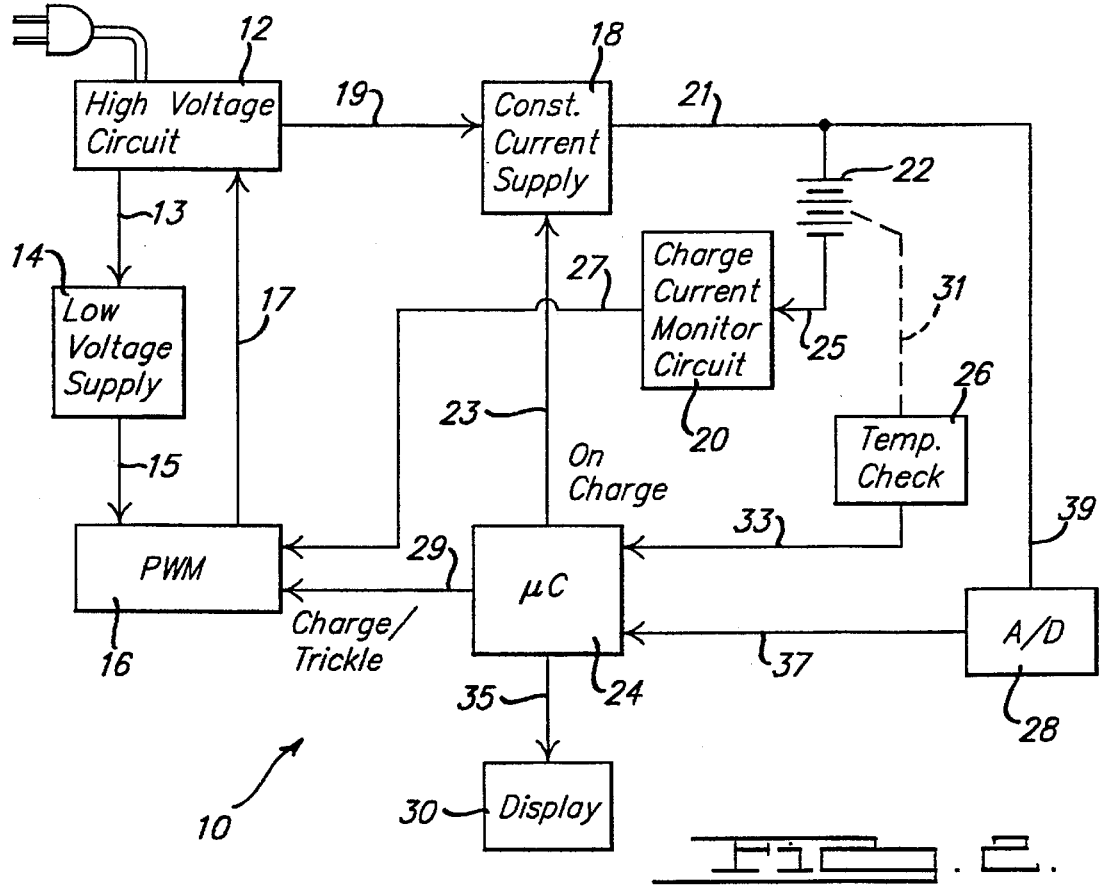
FIG. 2 is a schematic block diagram showing the major operational and control circuitry of a fast battery charging system.

The basic circuit components operable to be used in an inflection analysis fast battery charger will first be discussed. It is noted that these components are illustrated by way of a nonlimiting example as other circuit configurations will be equally applicable. Turning to FIG. 2, a half bridge-type power supply circuit 10 is shown in a block circuit diagram. Circuit 10 includes a high voltage input circuit 12 for supplying high voltage to some components of the circuit 10, a low voltage power supply circuit 14 for supplying a low voltage supply to other components of the circuit 10, a pulse width modulation oscillator circuit 16 for generating a high frequency output to be used as a control input for the high voltage circuit 12, a constant current supply circuit 18 for providing a constant current supply to a battery 22 to be charged, and a charge current monitoring circuit 20 for monitoring the charge current rate of the battery 22 and for providing a feedback signal to the pulse width modulation circuit 16 to desirably vary the control signal provided to the high voltage circuit 12. A microcomputer 24 is incorporated for controlling the charging scheme. Other circuit components of the circuit 10 include an optional temperature check circuit 26 which monitors the temperature of the battery 22, and a digital display circuit 30 for providing an indication to the operator of the various parameters of the charging process. Additionally, an analog-to-digital converter 28 is provided for converting the analog battery voltage signal from the battery 22 to a digital signal suitable for processing by the microcomputer 24.

The high voltage circuit 12 receives a 120 volt alternating current (AC) generally from a standard outlet. The alternating input signal is rectified and filtered to produce a smooth DC voltage of approximately 150 volts. The AC input signal is also applied, through a transformer (not shown), to the low voltage supply circuit 14 along line 13. The low voltage supply circuit 14 rectifies the AC signal and applies it to certain voltage regulator circuits (not shown) to provide regulated 5-volt and 15-volt outputs for the other circuit components. The various 5-volt and 15-volt supply lines to the other circuit components of the circuit have been omitted for clarity.

The pulse width modulator (PWM) oscillator circuit 16 receives a 15 volt signal from the supply circuit 14 along line 15 and provides a pulsed frequency signal, generally in the form of a square wave, along line 17 to the high voltage circuit 12. The square wave signal from the oscillator circuit 16 is provided through a coupling transformer (not shown) to a pair of power switching transistors (not shown) which, via conventional phase control techniques, regulate the amount of current supplied to the primary coil of the main step down transformer for each half cycle of the AC waveform. The step down transformer converts the high voltage signal on its primary coil to a low voltage, high current signal at its secondary coil and applies this signal to the constant current supply circuit 18 along line 19. The duty cycle of the pulse width modulator signal from the oscillator circuit 16 thus controls the level of charging current applied to the battery 22. The pulse width modulation approach minimizes the size of the step down transformer required to provide the necessary high current to the current supply circuit 18. PWM oscillator circuit 16 also includes a soft start circuit (not shown) for gradually ramping up the duty cycle of the PWM oscillator circuit 16 when the charging sequence is initiated.

When the microcomputer 24 initiates a charging sequence by applying a signal on line 23 to the current supply circuit 18, charge current is applied to the battery 22 through the low voltage constant current supply circuit 18 along line 21. The current supply circuit 18 preferably includes a reverse polarity detection circuit (not shown) which protects the circuit 10 from damage in the event that the battery 22 is inserted backwards. The battery current is sensed along line 25 by charge current monitoring circuit 20. If the charge current varies from the predetermined level, the charge current monitoring circuit 20 will provide an output on line 27 to the PWM oscillator circuit 16. The PWM oscillator circuit 16 will then alter the duty cycle of the square wave signal to the high voltage circuit 12 in order to alter the current charge current appropriately. Likewise, at the end of the high current charging sequence, the microcomputer 24 produces an output signal on a charge/trickle line 29 to switch to a trickle charge mode.

The temperature check circuit 26 provides a circuit for monitoring battery temperature. The dotted line 31 from the temperature check circuit 26 represents a heat sensing device, such as a thermistor, that is physically located adjacent the position of the battery 22 when it is plugged into the charger to sense the temperature of the battery 22. The temperature check circuit 26 determines when the battery temperature exceeds a predetermined threshold value and in such event sends a signal along line 33 to the microcomputer 24. The microcomputer 24 then sends a signal on line 23 to halt the charging process.

In order to enable the microcomputer 24 to monitor the charging sequence to determine the inflection points in the charging curve of FIG. 1, it is necessary to convert the analog battery voltage signal to a digital signal. Therefore, an analog-to-digital converter 28 is incorporated. The analog-to-digital converter 28 receives the analog battery voltage on line 39 and produces a digital signal on line 37 which the microcomputer 24 uses to determine the battery voltage value. If desired the digital signal may be in the form of a timing signal in which clock pulses are produced and counted to yield digital "count" values representing voltage.

Inflection points in the charging curve are determined by monitoring the slope of the curve (the first derivative or time rate of change of the curve) to detect when the slope reaches a minimum value or a maximum value; i.e., when the rate of change in the slope changes from a negative value to a positive value or from a positive value to a negative value. In practice, this is accomplished by taking the difference between successive voltage readings and by determining when the difference reaches a minimum or a maximum value.

With reference to FIG. 1, it is seen that the voltage derivative curve dV/dt changes from increasing to decreasing at second inflection point B. Therefore, if the battery charging operation commences when the battery voltage is in Region I, the battery voltage will pass through both inflection points A and B. On the other hand, if the battery is already partially charged such that the battery charging operation commences in Region III, the A inflection point is never reached. In either case, however, the battery charging operation should be caused to terminate after the B inflection point is detected, as this represents the fully charged condition. Note that the battery voltage actually begins to fall off or drop shortly after the actual charge termination point C is reached. This region should therefore be avoided as this is the region in which overtemperature and high pressure conditions begin to manifest themselves.

The presently preferred embodiment uses a state of charge detection technique to enable microprocessor 24 to know at the outset of the charging operation whether the battery voltage is already beyond the A inflection point. This is done by subjecting the battery to a short current pulse or test current and then observing how the battery voltage responds to that current pulse after it is terminated. The flowchart of FIG. 3 illustrates the procedure in detail.

Figure 3:
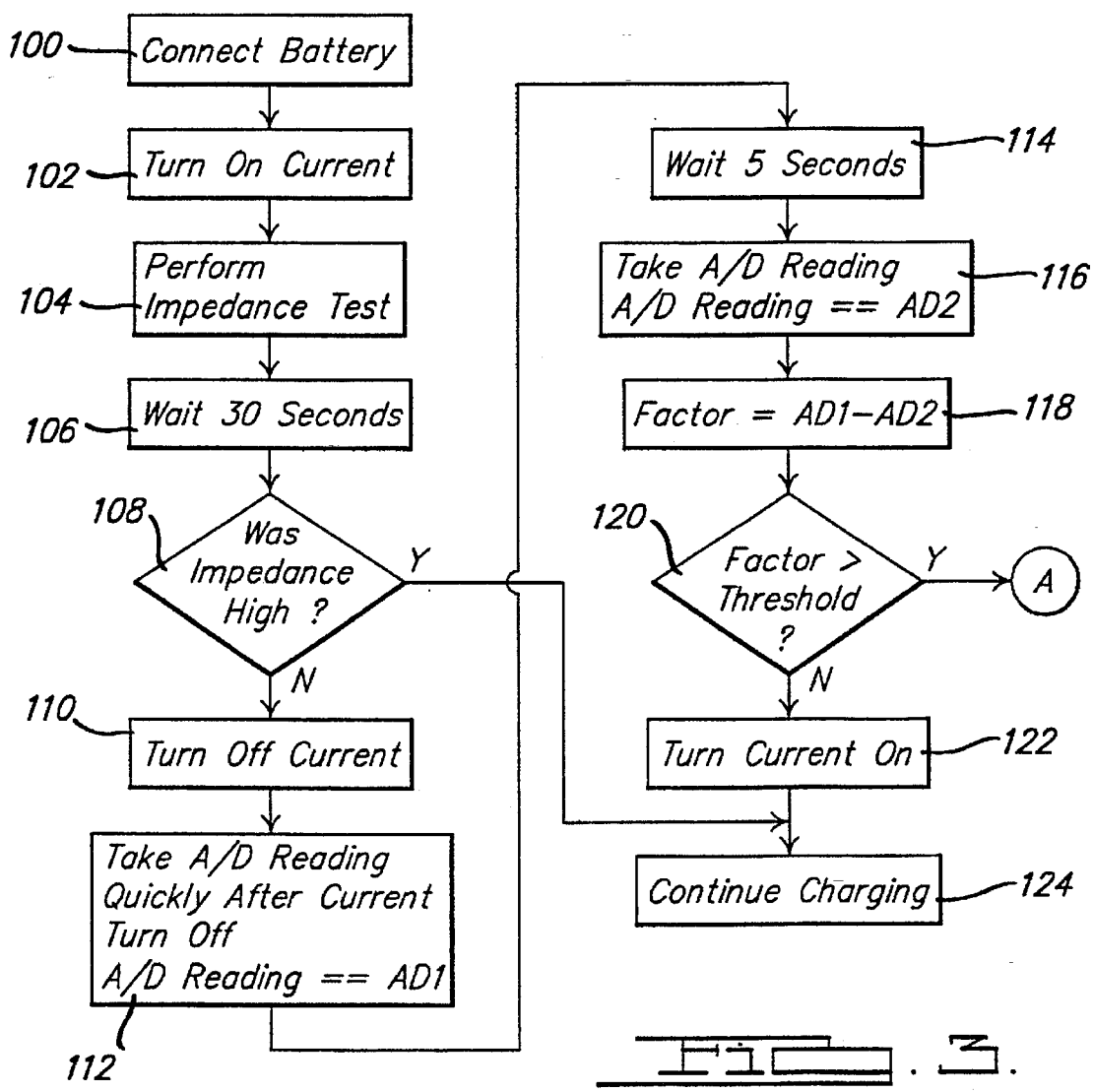
FIG. 3 is a flowchart diagram illustrating a presently preferred state of charge detection and charge current termination process in accordance with the techniques of the present invention.

Referring to FIG. 3, after the battery to be charged is connected to the charging circuit as indicated at step 100, microprocessor 24 initiates the state of charge test by causing current supply 18 to apply current to the battery as indicated at step 102. Next, a battery impedance test is performed at step 104 to determine the internal impedance of the battery. After this impedance test the control program waits a predetermined brief delay time at step 106, during which time charging current continues to be applied. The presently preferred embodiment employs a 30-second wait state at step 106. The wait time is not critical, however, and could be shorter, on the order of 5 to 10 seconds, if desired.

Next, at step 108 the measured battery impedance is compared to a predetermined impedance value. If the battery impedance is above the predetermined value, indicating a high impedance battery condition, control branches to step 124 where charging is simply allowed to continue. A high impedance battery condition can exhibit a state of charge characteristic similar to a fully charged battery of normal impedance. The high impedance condition generally corresponds to a battery which has been previously damaged and which will not hold a full charge. Thus the presently preferred routine bypasses steps 110–122, which are designed to handle charge termination of a fully charged or nearly fully charged battery which is already past the A inflection point at the outset of charging.

Figure 5:
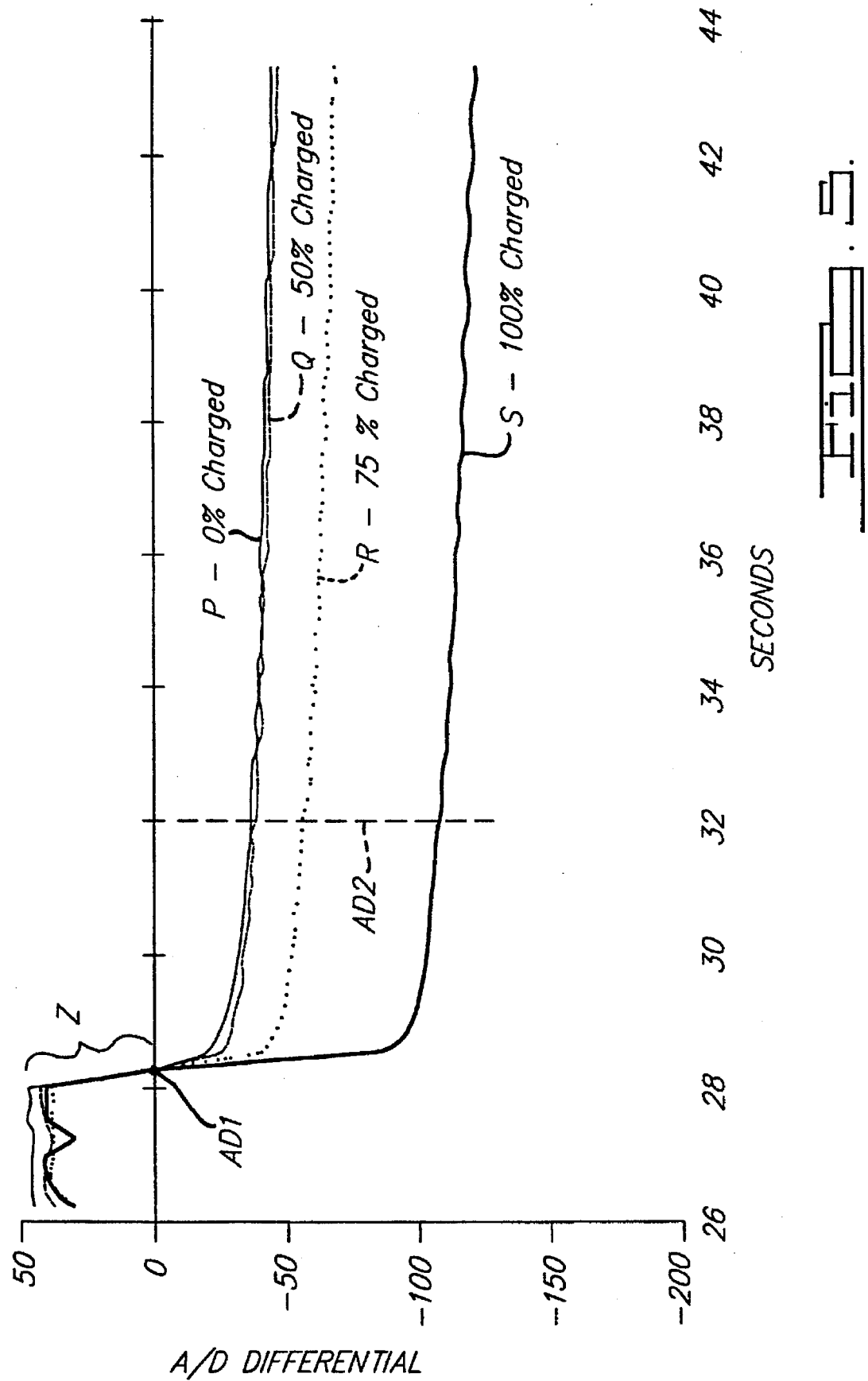
FIG. 5 is a graph showing battery voltage as a function of time for batteries of different initial states of charge after the state-of-charge test pulse is delivered.

Assuming the battery impedance is not abnormally high, control branches from step 108 to step 110 where the charging current is turned off. As soon as charging current is turned off, the battery voltage rapidly drops and then continues to decay exponentially. This is illustrated in FIG. 5 for batteries having different initial states of charge. As shown in FIG. 5, the initial rapid drop in voltage is attributable to the battery impedance Z.

As soon as charging current is turned off, or shortly thereafter, a first voltage reading is taken using the A to D converter 28. In FIG. 5 this voltage is designated AD1. This reading AD1 is stored, followed by a brief delay on the order of 5 seconds as indicated at step 114. After the brief delay a second reading is taken AD2. From these two readings a state of charge factor is determined. This state of charge factor is based on a comparison or difference (AD1–AD2). After the state of charge factor is determined at step 118, it is tested at step 120. If the state of charge factor is not greater than a predetermined threshold value, control proceeds to step 122 where the charging current is turned back on and control then continues at step 124 where the normal charging routine continues. On the other hand, if at step 120 the state of charge factor is greater than the predetermined threshold, control branches to a special charge termination routine designed to properly terminate charging where the battery is initially fully charged or nearly so.

Figure 4A:
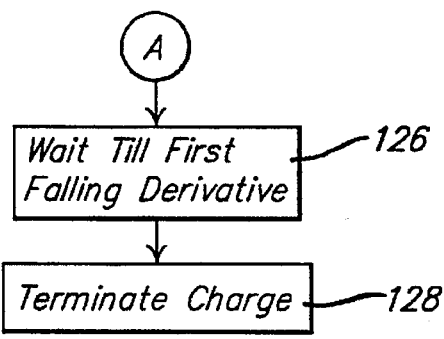
FIGS. 4a and 4b show alternate embodiments for terminating charging current.
Figure 4B:
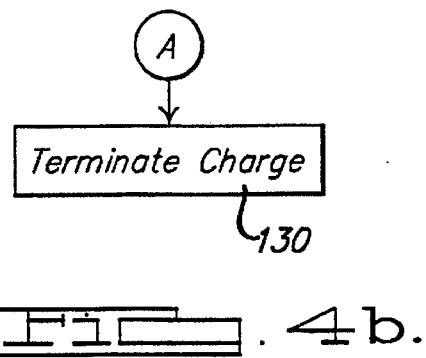

In FIGS. 4a and 4b two alternate termination routines have been illustrated. Both of these routines are designed to terminate charging where the battery is initially charged or nearly charged when connected to the charger at step 100. In the embodiment of FIG. 4a the control program waits at step 126 until a first falling derivative (i.e., inflection point B) is detected. Once this first falling derivative is detected, charging is terminated at step 128. In many cases, the predetermined threshold value employed at step 120 can be selected so that it is possible to simply terminate charging when the state of charge factor is greater than the threshold as determined at step 120. Thus, in FIG. 4b a simple alternate embodiment is provided where branching from step 120 simply causes charging to terminate at step 130. Although the routine of FIG. 4a is more effective at bringing the battery to a fully charged state, in practice, the routine of FIG. 4b is usually quite suitable, since there is usually very little difference between the final state of charge using either technique.

From the above it is seen that the charge termination technique is automatically changed to match the initial state of charge of the battery. For a fully charged battery or nearly fully charged battery charge termination is based on detection of solely the second inflection point B (FIG. 4a) or simply by immediately terminating charge (FIG. 4b). Batteries which are not initially fully charged or nearly so are subjected to the normal charge termination routines, which may include charge termination based on the Saar technique. Employing the Saar technique at step 124, charging will continue until a second inflection point in the battery voltage-time curve is detected. In other words, charging current is terminated when inflection point B is detected. Reference may be had to the cited Saar patents for a further explanation of this technique. Of course, other techniques can also be employed either in place of the Saar technique or in addition to it. For example, charge termination could also be based on detecting when the slope of the voltage-time curve goes negative. Referring to FIG. 1, it is seen that the voltage-time curve continually rises until the peak is reached shortly after point C in region IV. Beyond this point the voltage actually begins to decrease, hence the slope of the voltage-time curve changes from positive to negative.

The present invention is able to distinguish a battery which is initially charged or nearly fully charged from a battery which is initially discharged. As explained above, this is done by applying a test current pulse to the battery and then observing how the battery voltage decays after the pulse is delivered.

FIG. 5 illustrates the voltage decay of several batteries at different levels of charge. Specifically, the curve designated P represents a battery which is initially fully discharged. The curve Q (which lies virtually on top of curve P) represents a battery which is initially 50% charged. The curve R shows a battery which is initially 75% charged and the curve S shows a battery which is essentially fully charged. In each case the test current is applied to the batteries for approximately 28 seconds and then removed.

Upon removal of the test current the voltage decays as illustrated. Assuming a first voltage reading AD1 is taken substantially at the point depicted in FIG. 5 and a second voltage reading is taken at the point in time designated AD2 in FIG. 5, a voltage difference can be readily calculated. From the graph it is seen that the voltage difference (AD2–AD1) for batteries with less than 50% charge falls in the range of about 40 units. In the Figure the units are digital count values produced by the analog-to-digital converter circuit 28 illustrated in FIG. 2. It will be understood that these count values can be appropriately scaled so as to represent actual voltage values in volts or millivolts, for example. However, since the differential numbers are used for comparison purposes, it is not necessary to convert the values to voltage units.

With continued reference to FIG. 5 it will be seen that the voltage difference for a battery having 50% charge will yield a value of about 55 units, whereas a fully charged battery will yield a differential in excess of 100 units. Therefore, if, in a given application, it is desirable to distinguish between a battery having a substantially full charge from one having a 50% charge or lower, one would test the differential AD2 minus AD1 to determine whether it equals a number greater than that which will be achieved by a 50% charged battery. For example, the number 80 might be selected for this purpose. On the other hand, if it is desired to distinguish between a battery having a 50% charge from a battery having only a 25% charge, then the differential number chosen would need to fall somewhere between where curve Q crosses line AD2 and where curve R crosses line AD2. For example, a value of about 45 units might be appropriate for this purpose.

From the foregoing example it will be understood that a suitable $\Delta V$ differential value may be selected by examining the resulting voltage-time curves for a collection of batteries having known initial states of charge. Although the actual numeric values may differ depending on the type of battery involved, the principles of the state of charge test described above will remain applicable. Therefore, the exemplary curves illustrated in FIG. 5 are not intended as a limitation upon the scope of the invention.

While the invention has been described in connection with the presently preferred embodiment, it will be understood that certain modifications can be made to the illustrated embodiment without departing from the spirit of the invention as set forth in the appended claims.

What is claimed is:

1. A method of charging a battery comprising:

detecting the state of charge prior to charging;

initiating charging while monitoring the battery voltage variation with time;

terminating charging in accordance with the following:

(a) if the detected state of charge prior to charging is above a predetermined level, terminating charging in response to a fall in the value of the first derivative of the voltage variation with time; and (b) if the detected state of charge prior to charging is below a predetermined level, terminating charging in response to a change from a rising to a falling value of the first derivative of the voltage variation with time.

2. The method of claim 1 wherein said detecting step is performed by applying a current to said battery, then removing the applied current and measuring the battery voltage decay after removing the current and using the decay as an indication of the state of charge of the battery.

3. The method of claim 1 wherein said detecting step is performed by applying a current to said battery for a predetermined time and after said predetermined time sampling the battery voltage at least twice to determine a time rate of change in battery voltage and using said time rate of change as an indication of the state of charge of the battery prior to charging.

4. The method of claim 1 wherein said detecting step is performed by applying a current to said battery for a first predetermined time and after said first predetermined time sampling the battery voltage during a second period of time to determine a time rate of change in battery voltage and using said time rate of change as an indication of the state of charge of the battery prior to charging.

5. The method of claim 4 wherein said second period of time begins after a predetermined delay following the end of said first period of time.

6. The method of claim 5 wherein said predetermined delay is selected such that said second time period begins after change in battery voltage due to battery impedance has substantially abated.

7. The method of claim 1 wherein said detecting step is performed by applying a current to said battery, then removing the applied current and measuring the battery voltage decay after removing the current and using the voltage decay as an indication of state of charge as follows:

(a) if the voltage decay is above a predetermined decay, then the detected state of charge is deemed above said predetermined level; and (b) if the voltage decay is not above said predetermined decay, then the detected state of charge is deemed below said predetermined level.

8. The method of claim 1 wherein said detecting step is performed by applying a current to said battery, then removing the applied current and measuring the battery voltage decay after removing the current and using the voltage decay as an indication of state of charge as follows:
   (a) if the voltage decay is not below a predetermined decay, then the detected state of charge is deemed above said predetermined level; and
   (b) if the voltage decay is below said predetermined decay, then the detected state of charge is deemed below said predetermined level.

9. The method of claim 1 wherein the battery voltage variation with time is determined by periodically measuring battery voltage and computing a value indicative of first derivative of voltage with respect to time.

10. The method of claim 1 wherein said fall in the value of the first derivative of the voltage variation with time corresponds to a first occurrence of an inflection point in the battery voltage curve.

11. The method of claim 10 wherein said change from a rising to a falling value of the first derivative of the voltage variation with time corresponds to a second inflection point in the battery voltage curve.

12. The method of claim 1 wherein terminating charging in response to a change from a rising to a falling value of the first derivative of the voltage variation with time is performed by detecting when the rate of change in battery voltage first rises, then falls and then again rises, terminating charging in response to the latter occurrence of the falling rate of change.

13. The method of claim 1 wherein said detecting step is performed by applying a predetermined current to said battery for a predetermined time and thereafter sampling the battery voltage decay characteristics.

14. The method of claim 13 wherein said predetermined current is greater than one ampere.

15. The method of claim 13 wherein said predetermined time is less than one second.

16. A method of charging a battery comprising:
   detecting the state of charge prior to charging by applying a current to said battery, then removing the applied current and measuring the battery voltage decay after removing the current and using the decay as an indication of the state of charge of the battery;
   controlling charging in accordance with the following:
   (a) if the detected state of charge prior to charging is above a predetermined level, terminating charging; and
   (b) if the detected state of charge prior to charging is below a predetermined level, initiating charging while monitoring the battery voltage variation with time, and terminating charging in response to a change from a rising to a falling value of the first derivative of the voltage variation with time.

17. The method of claim 16 wherein said detecting step is performed by applying a current to said battery for a predetermined time and after said predetermined time sampling the battery voltage at least twice to determine a time rate of change in battery voltage and using said time rate of change as an indication of the state of charge of the battery prior to charging.

18. The method of claim 16 wherein said detecting step is performed by applying a current to said battery for a first predetermined time and after said first predetermined time sampling the battery voltage during a second period of time to determine a time rate of change in battery voltage and using said time rate of change as an indication of the state of charge of the battery prior to charging.

19. The method of claim 18 wherein said second period of time begins after a predetermined delay following the end of said first period of time.

20. The method of claim 19 wherein said predetermined delay is selected such that said second time period begins after change in battery voltage due to battery impedance has substantially abated.

21. The method of claim 16 wherein said detecting step is performed by applying a current to said battery, then removing the applied current and measuring the battery voltage decay after removing the current and using the voltage decay as an indication of state of charge as follows:
   (a) if the voltage decay is above a predetermined decay, then the detected state of charge is deemed above said predetermined level; and
   (b) if the voltage decay is not above said predetermined decay, then the detected state of charge is deemed below said predetermined level.

22. The method of claim 16 wherein said detecting step is performed by applying a current to said battery, then removing the applied current and measuring the battery voltage decay after removing the current and using the voltage decay as an indication of state of charge as follows:
   (a) if the voltage decay is not below a predetermined decay, then the detected state of charge is deemed above said predetermined level; and
   (b) if the voltage decay is below said predetermined decay, then the detected state of charge is deemed below said predetermined level.

23. The method of claim 16 wherein the battery voltage variation with time is determined by periodically measuring battery voltage and computing a value indicative of the first derivative of voltage with respect to time.

24. The method of claim 16 wherein said detecting step is performed by applying a predetermined current to said battery for a predetermined time and thereafter sampling the battery voltage decay characteristics.

25. The method of claim 24 wherein said predetermined current is greater than one ampere.

26. The method of claim 24 wherein said predetermined time is less than one second.

27. The method of determining the state of charge of a battery comprising:
   applying a current to said battery;
   thereafter removing the applied current; and
   measuring the battery voltage decay after removing the current and using the voltage decay as an indication of the state of charge of the battery.

28. The method of claim 27 further comprising applying a current to said battery for a predetermined time and after said predetermined time sampling the battery voltage at least twice to determine a time rate of change in battery voltage and using said time rate of change as an indication of the state of charge of the battery.

29. The method claim 27 further comprising applying a current to said battery for a first predetermined time and after said first predetermined time sampling the battery voltage during a second period of time to determine a time rate of change in battery voltage and using said time rate of change as an indication of the state of charge of the battery.

30. The method of claim 29 wherein said second period of time begins after a predetermined delay following the end of said first period of time.

31. The method of claim 30 wherein said predetermined delay is selected such that said second time period begins after change in battery voltage due to battery impedance has substantially abated.

32. The method of claim 27 further comprising using the voltage decay as an indication of state of charge as follows:
   (a) if the voltage decay is above a predetermined decay, then the state of charge of the battery is deemed above a predetermined level indicative of a substantially fully charged condition; and
   (b) if the voltage decay is not above said predetermined decay, then the state of charge of the battery is deemed below said predetermined level.

33. The method of claim 27 wherein said step of using the voltage decay as an indication of state of charge as follows:
   (a) if the voltage decay is not below a predetermined decay, then the detected state of charge is deemed above a predetermined level indicative of a substantially, fully charged condition; and
   (b) if the voltage decay is below said predetermined decay, then the detected state of charge is deemed below said predetermined level.

34. The method of controlling the charging operation of a battery charger comprising:
   applying a current to said battery;
   thereafter removing the applied current; and
   measuring the battery voltage decay after removing the current and using the voltage decay as an indication of the state of charge of the battery; and
   if the detected state of charge is above a predetermined level, terminating the charging operation;
   if the detected state of charge is below a predetermined level, permitting the charging operation to proceed.

35. The method of claim 34 further comprising applying a current to said battery for a predetermined time and after said predetermined time sampling the battery voltage at least twice to determine a time rate of change in battery voltage and using said time rate of change as an indication of the state of charge of the battery.

36. The method of claim 34 further comprising applying a current to said battery for a first predetermined time and after said first predetermined time sampling the battery voltage during a second period of time to determine a time rate of change in battery voltage and using said time rate of change as an indication of the state of charge of the battery.

37. The method of claim 36 wherein said second period of time begins after a predetermined delay following the end of said first period of time.

38. The method of claim 37 wherein said predetermined delay is selected such that said second time period begins after change in battery voltage due to battery impedance has substantially abated.

39. The method of claim 34 further comprising using the voltage decay as an indication of state of charge as follows:
   (a) if the voltage decay is above a predetermined decay, then the detected state of charge is deemed above said predetermined level; and
   (b) if the voltage decay is not above said predetermined decay, then the detected state of charge is deemed below said predetermined level.

40. The method of claim 34 wherein said step of using the voltage decay as an indication of state of charge as follows:
   (a) if the voltage decay is not below a predetermined decay, then the detected state of charge is deemed above said predetermined level; and
   (b) if the voltage decay is below said predetermined decay, then the detected state of charge is deemed below said predetermined level.

41. A method of charging a battery comprising the steps of:
   detecting the state of charge of the battery prior to charging by applying a current to said battery for a relatively brief period of time, removing the applied current, and then measuring the battery voltage decay as an indication of the state of charge of the battery; and
   controlling charging of the battery in accordance with the initially detected state of charge of the battery.

42. The method of claim 41 wherein said controlling step includes:
   initiating charging of the battery; and controlling the termination of charging in accordance with the initially detected state of charge of the battery.

43. The method of claim 42 wherein said detecting step is performed by applying a current to said battery for a predetermined time and after said predetermined time sampling the battery voltage at least twice to determine a time rate of change in battery voltage and using said time rate of change as an indication of the state of charge of the battery prior to charging.

44. The method of claim 42 wherein said detecting step is performed by applying a current to said battery for a first predetermined time and after said first predetermined time sampling the battery voltage during a second period of time to determine a time rate of change in battery voltage and using said time rate of change as an indication of the state of charge of the battery prior to charging.

45. The method of claim 44 wherein said second period of time begins after a predetermined delay following the end of said first period of time.

46. The method of claim 45 wherein said predetermined delay is selected such that said second time period begins after change in battery voltage due to battery impedance has substantially abated.

47. The method of claim 42 wherein said controlling charge termination step is performed by monitoring battery voltage variation with time and terminating charge as follows:
   (a) if the voltage decay is above a predetermined level, terminating charging in response to a fall in the first derivative of the battery voltage variation with time; and
   (b) if the voltage decay is below said predetermined level, terminating charging in response to a change from a rising to a falling value of the first derivative of the battery voltage variation with time.

* * * * *